United States Patent
Kassner

(10) Patent No.: US 7,543,484 B2
(45) Date of Patent: Jun. 9, 2009

(54) METHOD FOR CORRECTING A MEASURED CYLINDER PRESSURE OF AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 11/662,372

(22) PCT Filed: Jul. 11, 2005

(86) PCT No.: PCT/EP2005/053309

§ 371 (c)(1),
(2), (4) Date: Sep. 26, 2007

(87) PCT Pub. No.: WO2006/027285

PCT Pub. Date: Mar. 16, 2006

(65) Prior Publication Data

US 2008/0173070 A1   Jul. 24, 2008

(30) Foreign Application Priority Data

Sep. 9, 2004   (DE)   .......... 10 2004 044 339

(51) Int. Cl.
*G01M 15/08* (2006.01)
(52) U.S. Cl. .................................. 73/114.18
(58) Field of Classification Search .......... 73/35.07, 73/35.12, 35.13, 114.16, 114.17, 114.18
See application file for complete search history.

(56) References Cited

U.S. PATENT DOCUMENTS

| | | | | |
|---|---|---|---|---|
| 4,227,403 A * | 10/1980 | Dooley et al. | ............ | 73/114.21 |
| 4,382,377 A * | 5/1983 | Kleinschmidt et al. | ..... | 73/35.13 |
| 5,373,448 A | 12/1994 | Katogi et al. | | |
| 6,397,669 B1 * | 6/2002 | Raichle et al. | ........... | 73/114.06 |
| 7,334,566 B2 * | 2/2008 | Klingseis | ..................... | 123/337 |

FOREIGN PATENT DOCUMENTS

| | | |
|---|---|---|
| DE | 197 42 006 | 3/1999 |
| DE | 197 49 817 | 5/1999 |
| JP | 61065127 | 4/1986 |
| JP | 4008850 | 1/1992 |
| JP | 5005665 | 1/1993 |
| JP | 10153465 | 6/1998 |
| JP | 2004084657 | 3/2004 |

* cited by examiner

*Primary Examiner*—Eric S McCall
(74) *Attorney, Agent, or Firm*—Kenyon & Kenyon LLP

(57) ABSTRACT

A method for correcting a measured cylinder pressure of an internal combustion engine, in which a cylinder pressure sensor is connected to a combustion chamber via a duct, disturbing portions resulting from whistle oscillations being suppressed by determining an oscillation frequency of a gas oscillation caused in the duct during a power stroke and filtering the measurement values of the cylinder pressure sensor using a band-stop filter having the previously determined oscillation frequency.

8 Claims, 2 Drawing Sheets

METHOD FOR CORRECTING A MEASURED CYLINDER PRESSURE OF AN INTERNAL COMBUSTION ENGINE

BACKGROUND INFORMATION

Cylinder pressure sensors are known that are integrated as much as possible into an already-existing component of the internal combustion engine. Typical embodiments are the integration of a suitable pressure transducer into a spark plug, a high-pressure injection valve, or a glow plug. The pressure transducer is usually clearly separated from the combustion chamber; on the one hand, the front part of the component is already allocated to the main task of the component and does not offer any constructive space for the pressure transducer, while on the other hand the pressure transducers are frequently provided with integrated electronic circuits that cannot be exposed to the high temperatures near the combustion chamber. The cylinder pressure is then transmitted from the combustion chamber to the pressure transducer via suitable ducts in the component.

It is known that these ducts can cause significant falsifications of the cylinder pressure signal. They act as resonators, and what are known as whistle oscillations falsify the signal. FIG. 2 shows a pressure curve with superposed whistle oscillation. A detailed analysis of the cylinder pressure and the calculation of suitable features is thus no longer possible. High-quality cylinder pressure sensors avoid this falsification by housing the pressure transducer flush with the combustion chamber.

An object of the present invention is therefore to enable more precise measurement of the temporal pressure curve even without housing the pressure transducer flush with the combustion chamber, and to suppress interference portions resulting from whistle oscillations.

SUMMARY OF THE INVENTION

This object is achieved by a method for correcting a measured cylinder pressure of an internal combustion engine, in which a cylinder pressure sensor is connected to a combustion chamber via a duct, an oscillation frequency of a gas oscillation caused in the duct being determined during a power stroke, and the measurement values of the cylinder pressure sensor being filtered by a band-stop filter having the previously determined oscillation frequency. The gas oscillation is what is known as a whistle oscillation, and from the point of view of the cylinder pressure sensor is expressed as an oscillation in pressure over time that is superposed on the actual pressure curve in the combustion chamber. The band-stop filter is preferably a digital filter. The oscillation frequency is the resonance frequency or inherent frequency of the gas column in the gas duct from the combustion chamber to the cylinder pressure sensor.

The oscillation frequency can be determined from a gas temperature in the combustion chamber, calculated from measured pressure values. The temperature of the gas is calculated from the combustion chamber pressure using a suitable known model. Alternatively, the oscillation frequency can be determined by a spectral analysis of the pressure curve in the combustion chamber. The whistle oscillation has a significantly higher frequency than does the fundamental oscillation of the pressure curve, which has the frequency of the rotational speed of the crankshaft. The whistle oscillation has a frequency in the kilohertz range. Because the fundamental oscillation is known from the rotational speed of the crankshaft, upper harmonics (the whistle oscillation) can be easily identified.

In a development of the method, it is provided that in a first method step the cylinder pressure curve is measured and stored for a complete working cycle. The pressure curve is then present as a time series in a storage unit, e.g. a memory-programmable control device.

In a development of the method, it is provided that in a second method step the gas temperature is determined and the whistle oscillation frequency is calculated therefrom. The gas temperature is calculated using an isentropic equation for a (ideal or real) gas.

In a third method step, in a preferred specific embodiment the filter coefficients are calculated for a band-stop filter. The band-stop filter is implemented as a program of the memory-programmable control unit; here, in particular a stop frequency and an attenuation factor are determined as parameters of the filter.

In a fourth method step, in the preferred specific embodiment the cylinder pressure curve is filtered using the band-stop filter. The time series is subjected to the filter, and the filtered values can be written back into the same memory cells.

The problem cited above is also solved by a control device for an internal combustion engine that is capable of executing a method according to the present invention.

DETAILED DESCRIPTION

Figure 1:
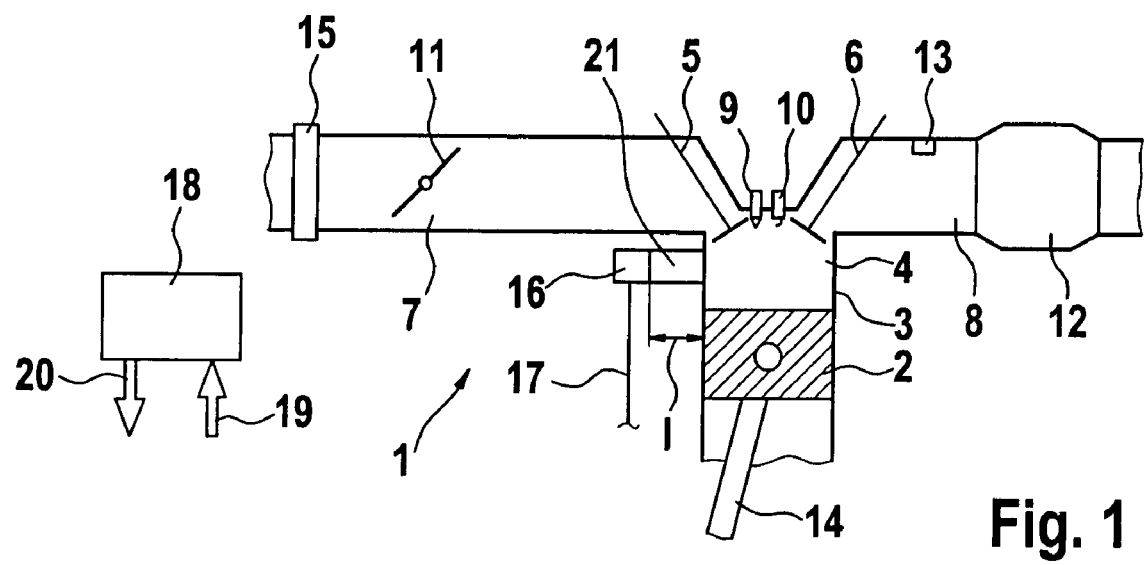
FIG. 1 shows a sketch of a cylinder of an internal combustion engine.

An internal combustion engine 1 according to FIG. 1 of a motor vehicle (not shown in more detail) includes a piston 2 that is capable of back-and-forth movement in a cylinder 3. Standard internal combustion engines 1 include a plurality of pistons 2 and cylinders 3. In the following, only one cylinder is presented in order to illustrate the concepts applied. As a rule, internal combustion engine 1 will include a plurality of cylinders. Cylinder 3 includes a combustion chamber 4 that is limited inter alia by a piston 2, an inlet valve 5, and an outlet valve 6. An intake pipe 7 is coupled to inlet valve 5, and an exhaust pipe 8 is coupled to outlet valve 6. In the area of inlet valve 5 and of outlet valve 6, an injection valve 9 and a spark plug 10 extend into combustion chamber 4 (in a spark-ignition engine having direct fuel injection). In a diesel engine, here only one injection valve 9, or a plurality of injection valves 9, will be present, while in a spark-ignition engine only one or a plurality of spark plugs 10 will be present. Via injection valve 9, fuel can be injected into combustion chamber 4. The fuel in combustion chamber 4 can be ignited by spark plug 10. In intake pipe 7, a rotatable throttle valve 11 is housed via which air is able to be supplied to intake pipe 7. An air mass sensor 15 is situated upstream or downstream from throttle valve 11. The quantity of supplied air is dependent on the angular position of throttle valve 11. In a spark-ignition engine, in exhaust gas pipe 8 there is situated a lambda probe 13 for the measurement of the λ value of the fuel combustion in combustion chamber 4. Downstream from lambda probe 13, there is situated a catalytic converter 12 that is used for additional chemical conversion of harmful materials contained in the exhaust gases.

Piston 2 is connected via a connecting rod 14 (shown schematically) to a crankshaft (not shown) of the internal combustion engine. Piston 2 is set into motion by the combustion of the fuel/air mixture in combustion chamber 4 during a power stroke, and this movement is converted into a rotational movement in a known manner by connecting rod 14 and the crankshaft. A control device 18 is charged with input signals 19 that represent operating quantities, measured by sensors, of internal combustion engine 1. For example, control device 18 is connected to air mass sensor 15, lambda sensor 13, a rotational speed sensor, an air temperature sensor, and the like. In addition, control device 18 is connected to an accelerator pedal sensor that produces a signal that indicates the position of an accelerator pedal that is able to be actuated by a driver, and thus indicates the required torque. Control device 18 produces output signals 20 with which the behavior of internal combustion engine 1 can be influenced via actuators or actuating elements. For example, control device 18 is connected to injection valve 9, spark plug 10 and throttle valve 11, and the like, and produces the signals required to control these.

Control device 18 is provided for, inter alia, the purpose of controlling or regulating the operating quantities of internal combustion engine 1. For example, the fuel mass injected into combustion chamber 4 by injection valve 9 is controlled or regulated by control device 18 in particular with respect to low fuel consumption and/or low production of pollutants. For this purpose, control device 18 is provided with a microprocessor that has stored in a storage medium, such as for example a read-only memory (ROM), a program that controls the above-named method steps.

Figure 2:
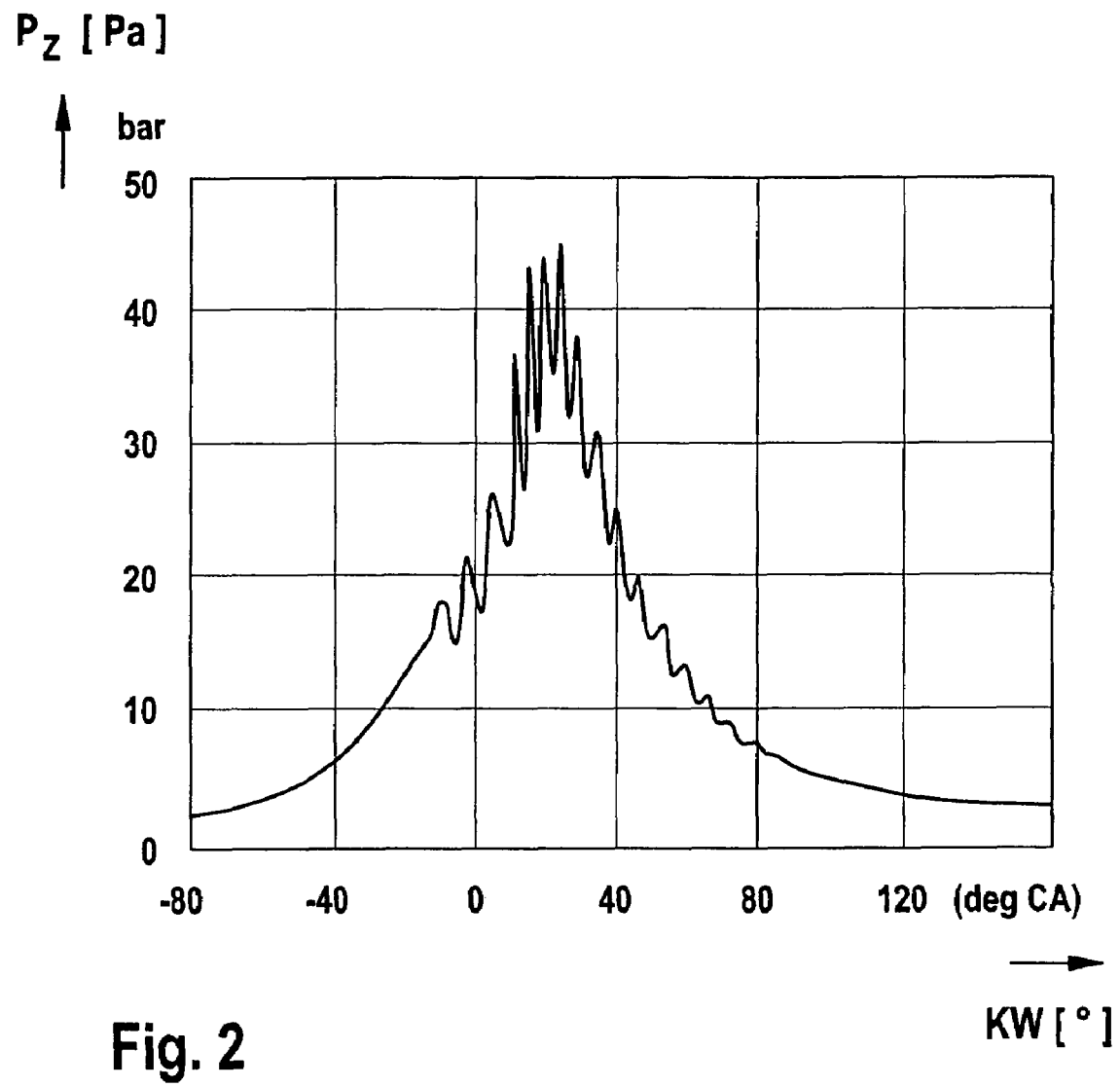
FIG. 2 shows a pressure curve in a combustion chamber with superposed whistle oscillation.

On combustion chamber 4, a cylinder pressure sensor 16 is situated that is connected to control device 18 by an electrical line 17. Between cylinder pressure sensor 16 and combustion chamber 4, there is situated a duct 21 having length l. The installation position of cylinder pressure sensor 16 is indicated only schematically, and can vary according to the available constructive space and other requirements. The curve of the cylinder pressure provided by cylinder pressure sensor 16, and quantities derived therefrom, are used as the input signal for various control functions. Output signals of the control unit are for example control signals for the fuel metering and for controlling the ignition of the mixture. Cylinder pressure sensor 16 supplies a signal according to FIG. 2; whistle oscillations due to duct 21 are superposed on the actual pressure curve. FIG. 2 shows the combustion chamber pressure $P_Z$ in pascals over crankshaft angle KW in degrees; via the rotational speed, KW can be converted into a time series.

The method is based on a modeling of the whistle oscillation, so that a suitable filtering of the measured cylinder pressure curve can take place before the actual thermodynamic features are calculated from the cylinder pressure. The basic idea is to suppress the singular frequency of the whistle oscillation using a filter that blocks this frequency (known as a band-stop characteristic). Using a digital method, a digital filter, this is possible for the measured pressure curve after the complete working cycle has been acquired.

One embodiment is the storing of the filter coefficients (once determined) in the control unit for the various frequencies of the whistle oscillation, or else the calculation of the respective coefficients dependent on the operating point of the internal combustion engine.

From the literature, the relation between the frequency of the excited whistle oscillation f and the sound velocity c is known. c is determined from the length l of duct 21 between combustion chamber 4 and cylinder pressure sensor 16, as well as from gas temperature T, the gas constant R, and the isentropic exponent $\chi$:

$$f = c/(4*l)$$

with $$c = \sqrt{\chi R^* T}$$

That is, for the operating points of the internal combustion engine (e.g. described by rotational speed, load, air/fuel ratio), the frequency f can be determined. Here the most important variable parameter is the gas temperature T. This temperature can be determined once during the calibration of the control unit, and stored in characteristic fields. Another possibility is calculation using a suitable thermodynamic model.

Another possible realization is the spectral analysis of the cylinder pressure signal. The whistle oscillation can in this way be determined in its frequency dependent on the operating point. The spectral analysis can take place offline during the calibration for different operating points of the internal combustion engine, or can take place online for each operating cycle. The suitable filter can then again be selected in order to sufficiently suppress this frequency.

A particular advantage of the almost complete storing of a working cycle is the possibility of compensating the undesired phase shift of the cylinder pressure signal by running through the filter twice (null phase filtering). In this way, the important relations between the crankshaft angle and the cylinder pressure curve are not falsified.

To sum up, the sequence of the correction method is described below:
- sampling of the cylinder pressure curve for a complete working cycle with sufficient sampling frequency, and storing of the signal
- determination of the gas temperature and calculation of the whistle oscillation frequency
- determination of the filter coefficients for a band-stop filter
- filtering of the cylinder pressure curve For engine controlling systems, this method can effectively compensate the basic disadvantage of the situation of the cylinder pressure transducer away from the combustion chamber. The advantages of the situation, namely advantageous placement in a component and low thermal loading of the pressure transducer, are retained.

What is claimed is:

1. A method for correcting a measured cylinder pressure of an internal combustion engine, in which a cylinder pressure sensor is connected via a duct to a combustion chamber, the method comprising:
   determining an oscillation frequency of a gas oscillation caused in the duct during a power stroke; and
   filtering measurement values of the cylinder pressure sensor by a band-stop filter having a previously determined oscillation frequency.

2. The method according to claim 1, wherein the oscillation frequency is determined from a gas temperature in the combustion chamber that is calculated from measured pressure values.

3. The method according to claim 1, wherein the oscillation frequency is determined by a spectral analysis of a pressure curve in the combustion chamber.

4. The method according to claim 1, further comprising, in a first method step, measuring and storing a cylinder pressure curve for a complete working cycle.

5. The method according to claim 4, further comprising, in a second method step, determining a gas temperature, and calculating a whistle oscillation frequency therefrom.

6. The method according to claim 5, further comprising, in a third method step, calculating filter coefficients for the band-stop filter.

7. The method according to claim 6, further comprising, in a fourth method step, filtering a cylinder pressure curve using the band-stop filter.

8. A control device for an internal combustion engine for correcting a measured cylinder pressure of the engine, in which a cylinder pressure sensor is connected via a duct to a combustion chamber, the device comprising:
- an arrangement for determining an oscillation frequency of a gas oscillation caused in the duct during a power stroke; and
- an arrangement for filtering measurement values of the cylinder pressure sensor by a band-stop filter having a previously determined oscillation frequency.

* * * * *